US011967285B2

(12) United States Patent
Yin et al.

(10) Patent No.: US 11,967,285 B2
(45) Date of Patent: Apr. 23, 2024

(54) DISPLAY PANEL, DISPLAY APPARATUS, AND CURRENT SENSING METHOD FOR PIXEL DRIVING CIRCUIT OF DISPLAY APPARATUS

(71) Applicant: BOE TECHNOLOGY GROUP CO., LTD., Beijing (CN)

(72) Inventors: Xinshe Yin, Beijing (CN); Xinbin Han, Beijing (CN); Hualing Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/245,107

(22) PCT Filed: Mar. 4, 2022

(86) PCT No.: PCT/CN2022/079418

§ 371 (c)(1),
(2) Date: Mar. 13, 2023

(87) PCT Pub. No.: WO2022/252723

PCT Pub. Date: Dec. 8, 2022

(65) Prior Publication Data

US 2023/0368739 A1 Nov. 16, 2023

(30) Foreign Application Priority Data

Jun. 1, 2021 (CN) ......................... 202110608947.0

(51) Int. Cl.
*G09G 3/3258* (2016.01)
*G09G 3/20* (2006.01)

(52) U.S. Cl.
CPC ......... *G09G 3/3258* (2013.01); *G09G 3/2096* (2013.01); *G09G 2300/0452* (2013.01);
(Continued)

(58) Field of Classification Search
CPC ............... G09G 3/3258; G09G 3/2096; G09G 2300/0452; G09G 2300/0819;
(Continued)

(56) References Cited

U.S. PATENT DOCUMENTS

| | | | |
|---|---|---|---|
| 2011/0122119 A1 | 5/2011 | Bae et al. | |
| 2015/0179107 A1 | 6/2015 | Kim | |

(Continued)

FOREIGN PATENT DOCUMENTS

| | | |
|---|---|---|
| CN | 102074189 A | 5/2011 |
| CN | 105280140 A | 1/2016 |

(Continued)

OTHER PUBLICATIONS

Xie Hong-Jun et al., Electronic-compensation technique for improving the degradation of AMOLED devices, Chinese Journal of Liquid Crystals and Displays, Apr. 2019, pp. 336-341, vol. 34, No. 4.

(Continued)

*Primary Examiner* — Stacy Khoo
(74) *Attorney, Agent, or Firm* — IP & T GROUP LLP

(57) ABSTRACT

A display panel includes sub-pixels and set voltage generation circuit(s); each sub-pixel includes a pixel driving circuit and a first light-emitting device, the pixel driving circuit includes at least a driving transistor and a sensing transistor, a first electrode of the sensing transistor is electrically connected to a sensing signal terminal; an output terminal of a set voltage generation circuit is electrically connected to a sensing signal terminal of at least one sub-pixel; the set voltage generation circuit is configured to generate a set voltage signal and transmit it to a sensing transistor of the at least one sub-pixel and a second electrode of a driving transistor of the at least one sub-pixel in a sensing period; and a voltage of the set voltage signal is substantially equal
(Continued)

to a voltage of the second electrode of the driving transistor of the at least one sub-pixel in the driving period.

17 Claims, 8 Drawing Sheets

(52) U.S. Cl.
CPC ............... *G09G 2300/0819* (2013.01); *G09G 2300/0842* (2013.01); *G09G 2320/045* (2013.01); *G09G 2320/0626* (2013.01); *G09G 2330/028* (2013.01)

(58) Field of Classification Search
CPC ..... G09G 2300/0842; G09G 2320/045; G09G 2320/0626; G09G 2330/028
See application file for complete search history.

(56) References Cited

U.S. PATENT DOCUMENTS

| | | | |
|---|---|---|---|
| 2016/0055791 | A1 | 2/2016 | Kishi et al. |
| 2016/0125811 | A1 | 5/2016 | Park et al. |
| 2017/0032738 | A1 | 2/2017 | Lee |
| 2017/0039933 | A1 | 2/2017 | Shin |
| 2017/0046006 | A1 | 2/2017 | Kim et al. |
| 2017/0069273 | A1 | 3/2017 | Park |
| 2017/0270867 | A1 | 9/2017 | Zhu et al. |
| 2018/0061293 | A1 | 3/2018 | Park |
| 2018/0061296 | A1 | 3/2018 | Shim |
| 2018/0144689 | A1 | 5/2018 | Hong et al. |
| 2018/0204516 | A1 | 7/2018 | Hwang et al. |
| 2018/0254006 | A1 | 9/2018 | Hwang et al. |
| 2019/0206313 | A1* | 7/2019 | Xia ...................... H10K 59/353 |
| 2020/0152135 | A1 | 5/2020 | Kang |
| 2020/0160789 | A1 | 5/2020 | Park |
| 2020/0193918 | A1 | 6/2020 | Hwang et al. |
| 2020/0327855 | A1* | 10/2020 | Lin ...................... G09G 3/3233 |
| 2021/0035501 | A1 | 2/2021 | Feng et al. |
| 2021/0150981 | A1 | 5/2021 | Lee et al. |
| 2022/0005412 | A1 | 1/2022 | Xie |
| 2022/0199017 | A1* | 6/2022 | Kim ..................... G09G 3/3275 |

FOREIGN PATENT DOCUMENTS

| | | | |
|---|---|---|---|
| CN | 105321957 | A | 2/2016 |
| CN | 105895020 | A | 8/2016 |
| CN | 105913802 | A | 8/2016 |
| CN | 106531074 | A | 3/2017 |
| CN | 107799040 | A | 3/2018 |
| CN | 110503920 | A | 11/2019 |
| CN | 112309331 | A | 2/2021 |
| CN | 113362763 | A | 9/2021 |
| KR | 10-2016-0050832 | A | 5/2016 |
| KR | 10-2017-0020684 | A | 2/2017 |

OTHER PUBLICATIONS

Yang Bi-Wen, Overview of Compensation for AMOLED Driving TFT Threshold Voltage, 2013, pp. 4-8, China Academic Journal Electronic Publishing House.

Notification to Grant Patent Right for Invention for the Chinese Patent Application No. 202110608947.0 issued by the Chinese Patent Office dated Apr. 27, 2023.

* cited by examiner

DISPLAY PANEL, DISPLAY APPARATUS, AND CURRENT SENSING METHOD FOR PIXEL DRIVING CIRCUIT OF DISPLAY APPARATUS

CROSS-REFERENCE TO RELATED APPLICATIONS

This application is a national phase entry under 35 USC 371 of International Patent Application No. PCT/CN2022/079418, filed on Mar. 4, 2022, which claims priority to Chinese Patent Application No. 202110608947.0, filed on Jun. 1, 2021, which are incorporated herein by reference in their entirety.

TECHNICAL FIELD

The present disclosure relates to the field of display technologies, and in particular, to a display panel, display apparatuses, and a current sensing method of a pixel driving circuit of a display apparatus.

BACKGROUND

Organic light-emitting diode (OLED) display panels have characteristics such as wide viewing angle, high contrast ratio, and fast response speed, so that organic light-emitting diodes included in the organic light-emitting diode display panels have higher light-emitting brightness and lower driving voltage compared to inorganic light-emitting display devices. Due to the above characteristics, the OLED display panels may be applied to mobile phones, monitors, notebook computers, digital cameras, instruments and other devices with display function.

SUMMARY

In an aspect, a display panel is provided. The display panel includes a plurality of sub-pixels and at least one set voltage generation circuit. Each of the plurality of sub-pixels includes a pixel driving circuit and a first light-emitting device, the pixel driving circuit includes at least a driving transistor and a sensing transistor, a first electrode of the driving transistor is electrically connected to a power supply voltage signal terminal, a first electrode of the sensing transistor is electrically connected to a sensing signal terminal, and a second electrode of the driving transistor is electrically connected to a second electrode of the sensing transistor and a first electrode of the first light-emitting device. An output terminal of a set voltage generation circuit is electrically connected to a sensing signal terminal of at least one sub-pixel. The set voltage generation circuit is configured to generate a set voltage signal, and transmit the set voltage signal to a sensing transistor of the at least one sub-pixel and a second electrode of a driving transistor of the at least one sub-pixel in a sensing period, so that an operating point of the driving transistor of the at least one sub-pixel maintains consistent in the sensing period and a driving period. A voltage of the set voltage signal is equal to or substantially equal to a voltage of the second electrode of the driving transistor of the at least one sub-pixel in the driving period.

In some embodiments, the set voltage generation circuit includes a first transistor, a first storage capacitor, and a second light-emitting device. A control electrode of the first transistor is configured to receive a control voltage signal, a first electrode of the first transistor is electrically connected to the power supply voltage signal terminal, and a second electrode of the first transistor is electrically connected to a first electrode of the second light-emitting device. A first electrode of the first storage capacitor is electrically connected to the control electrode of the first transistor, and a second electrode of the first storage capacitor is electrically connected to the second electrode of the first transistor. A second electrode of the second light-emitting device is electrically connected to a first voltage signal terminal. The first electrode of the second light-emitting device is used as the output terminal of the set voltage generation circuit, and a voltage signal of the first electrode of the second light-emitting device is the set voltage signal.

In some embodiments, electrical properties of the first transistor in the set voltage generation circuit are consistent with electrical properties of a driving transistor in a sub-pixel that is electrically connected to the set voltage generation circuit.

In some embodiments, electrical properties of the second light-emitting device in the set voltage generation circuit are consistent with electrical properties of a first light-emitting device in a sub-pixel that is electrically connected to the set voltage generation circuit.

In some embodiments, the display panel has a display area and a peripheral area, and the at least one set voltage generation circuit is disposed in the peripheral area.

In some embodiments, the display panel further includes a plurality of sensing signal lines; each sensing signal line is electrically connected to a sensing signal terminal of at least one sub-pixel; the sensing signal line is configured to obtain a sensing current signal of a driving transistor of a sub-pixel through a sensing transistor in the sensing period; and the output terminal of the set voltage generation circuit is electrically connected to at least one sensing signal line, so as to be electrically connected to the sensing signal terminal of the at least one sub-pixel through the at least one sensing signal line.

In some embodiments, the plurality of sub-pixels include at least sub-pixels of three colors. The display panel includes at least three set voltage generation circuits, each set voltage generation circuit is electrically connected to sub-pixels of a same color, and a color of light emitted by a second light-emitting device of each set voltage generation circuit is the same as a color of light emitted by first light-emitting devices of the sub-pixels of the same color electrically connected to each set voltage generation circuit.

In some embodiments, the plurality of sub-pixels are arranged in an array, sub-pixels in a same column are of a same color, and each sensing signal line is electrically connected to a same column of sub-pixels; each set voltage generation circuit is electrically connected to sensing signal lines, and the sensing signal lines electrically connected to each set voltage generation circuit are electrically connected to the sub-pixels of the same color.

In another aspect, a display apparatus is provided. The display apparatus includes the display panel as described in any of the embodiments of the above aspect, at least one current detection circuit and at least one set voltage follower circuit. Each current detection circuit is electrically connected to at least one sensing signal line, and the current detection circuit is configured to: receive a sensing current signal from a sensing signal line, integrate the sensing current signal, output a voltage drop, and calculate a value of a driving current of a driving transistor of a sub-pixel electrically connected to the sensing signal line according to the voltage drop; an input terminal of each set voltage follower circuit is electrically connected to the output terminal of the set voltage generation circuit, and an output terminal of each set voltage follower circuit is electrically connected to one or more current detection circuits; and the set voltage generation circuit is electrically connected to the sensing signal terminal of the at least one sub-pixel through the set voltage follower circuit, the one or more current detection circuits, and one or more sensing signal lines.

The set voltage follower circuit is configured to: receive the set voltage signal output by the set voltage generation circuit, perform a filtering process on the set voltage signal, and transmit a processed set voltage signal to the at least one sub-pixel.

In some embodiments, the set voltage follower circuit includes a first operational amplifier and a second storage capacitor. A non-inverting input terminal of the first operational amplifier is electrically connected to the output terminal of the set voltage generation unit, an inverting input terminal of the first operational amplifier is electrically connected to an output terminal of the first operational amplifier, and the output terminal of the first operational amplifier is used as the output terminal of the set voltage follower circuit; and a first electrode of the second storage capacitor is electrically connected to the non-inverting input terminal of the first operational amplifier, and a second electrode of the second storage capacitor is electrically connected to a second voltage signal terminal.

The one or more current detection circuits each include a second operational amplifier, an integrating capacitor, and a first switch. A non-inverting input terminal of the second operational amplifier is electrically connected to the output terminal of the set voltage generation circuit, an inverting input terminal of the second operational amplifier is coupled to the at least one of the one or more sensing signal lines, so that the output terminal of the set voltage generation circuit is electrically connected to a sensing signal terminal of at least one sub-pixel through the current detection circuit; the integrating capacitor is coupled between the inverting input terminal of the second operational amplifier and the output terminal of the second operational amplifier; and the first switch is coupled between the inverting input terminal of the second operational amplifier and the output terminal of the second operational amplifier, and the first switch and the integrating capacitor are connected in parallel.

In some embodiments, the display apparatus further includes a source driver. The source driver is electrically connected to the plurality of sub-pixels. The at least one current detection circuit and the at least one set voltage follower circuit are integrated in the source driver.

In yet another aspect, a current sensing method of a pixel driving circuit of a display apparatus is provided. The display apparatus is the display apparatus as described in any of the embodiments of the above aspect. In a case where the display panel included in the display apparatus includes the at least one set voltage generation circuit, and the set voltage generation circuit includes the first transistor, the first storage capacitor and the second light-emitting device, the current sensing method includes:

receiving, by the first transistor of the set voltage generation circuit, a control voltage signal and a power supply voltage signal; generating, by the first transistor of the set voltage generation circuit, a driving current due to the control voltage signal and the power supply voltage signal, a voltage of the control voltage signal being obtained according to a corresponding relationship between a target brightness of a first light-emitting device of a sub-pixel to be detected and a voltage value of a control electrode of the driving transistor of the sub-pixel to be detected; outputting, by the set voltage generation circuit, the set voltage signal according to the driving current; receiving, by a current detection circuit, the set voltage signal; and transmitting, by the current detection circuit, the set voltage signal to a sensing signal terminal of a sub-pixel electrically connected to the current detection circuit in the sensing period.

In yet another aspect, a display apparatus is provided. The display apparatus includes a display panel and a variable power supply voltage supply device. The display panel includes a plurality of sub-pixels, each sub-pixel includes a pixel driving circuit and a first light-emitting device, the pixel driving circuit includes at least a driving transistor and a sensing transistor, a first electrode of the driving transistor is electrically connected to a power supply voltage signal terminal, a first electrode of the sensing transistor is electrically connected to a sensing signal terminal, a second electrode of the driving transistor is electrically connected to a second electrode of the sensing transistor and a first electrode of the first light-emitting device, and a second electrode of the first light-emitting device is electrically connected to a first voltage signal terminal. The sensing signal terminal is configured to transmit an initial signal to the second electrode of the sensing transistor and the second electrode of the driving transistor in a sensing period.

The variable power supply voltage supply device is electrically connected to the power supply voltage signal terminal, and the variable power supply voltage supply device is configured to: provide a variable power supply voltage signal, provide a first power supply voltage signal to the sub-pixel in a driving period, and provide a second power supply voltage signal to the sub-pixel in the sensing period, so that an operating point of the driving transistor of the sub-pixel maintains consistent in the sensing period and the driving period.

A relationship between a voltage Vdd2 of the second power supply voltage signal and a voltage Vdd1 of the first power supply voltage signal, a voltage V2 of the second electrode of the driving transistor in the driving period, and a voltage Vini of the initial signal is: $Vdd2=Vini+(Vdd1-V2)$.

In some embodiments, the variable power supply voltage supply device is disposed on a circuit board, and the circuit board is electrically connected to the display panel.

BRIEF DESCRIPTION OF THE DRAWINGS

In order to describe technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
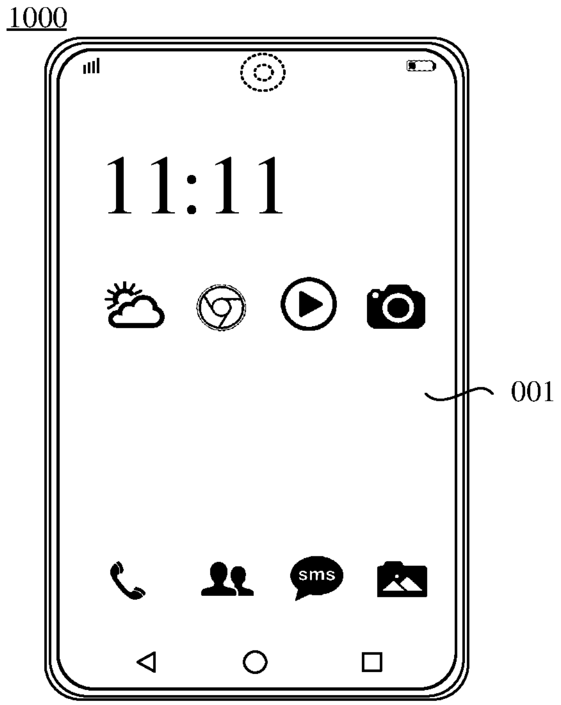
FIG. 1 is a structural diagram of a display apparatus, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the terms "a plurality of", "the plurality of" and "multiple" each mean two or more unless otherwise specified.

In the description of some embodiments, the terms "coupled", "connected" and derivatives thereof may be used. For example, the term "connected" may be used in the description of some embodiments to indicate that two or more components are in direct physical or electrical contact with each other. As another example, the term "connected" may be used in the description of some embodiments to indicate that two or more components are in direct physical or electrical contact. However, the term "coupled" or "communicatively coupled" may also indicate that two or more components are not in direct contact with each other, but still cooperate or interact with each other. The embodiments disclosed herein are not necessarily limited to the content herein.

As used herein, the term "if" is optionally construed as "when" or "in a case where" or "in response to determining" or "in response to detecting", depending on the context. Similarly, depending on the context, the phrase "if it is determined that" or "if [a stated condition or event] is detected" is optionally construed as "in a case where it is determined that", "in response to determining that", "in a case where [the stated condition or event] is detected" or "in response to detecting [the stated condition or event]".

The use of the phrase "applicable to" or "configured to" herein means an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values beyond those stated.

As used herein, the term such as "about", "substantially" or "approximately" includes a stated value and an average value within an acceptable range of deviation of a particular value. The acceptable range of deviation is determined by a person of ordinary skill in the art in view of measurement in question and errors associated with measurement of a particular quantity (i.e., limitations of a measurement system).

As shown in FIG. 1, some embodiments of the present disclosure provide a display apparatus 1000, and the display apparatus may be a television, a mobile phone, a computer, a notebook computer, a tablet computer, a personal digital assistant (PDA), an in-vehicle computer, etc.

Figure 2:
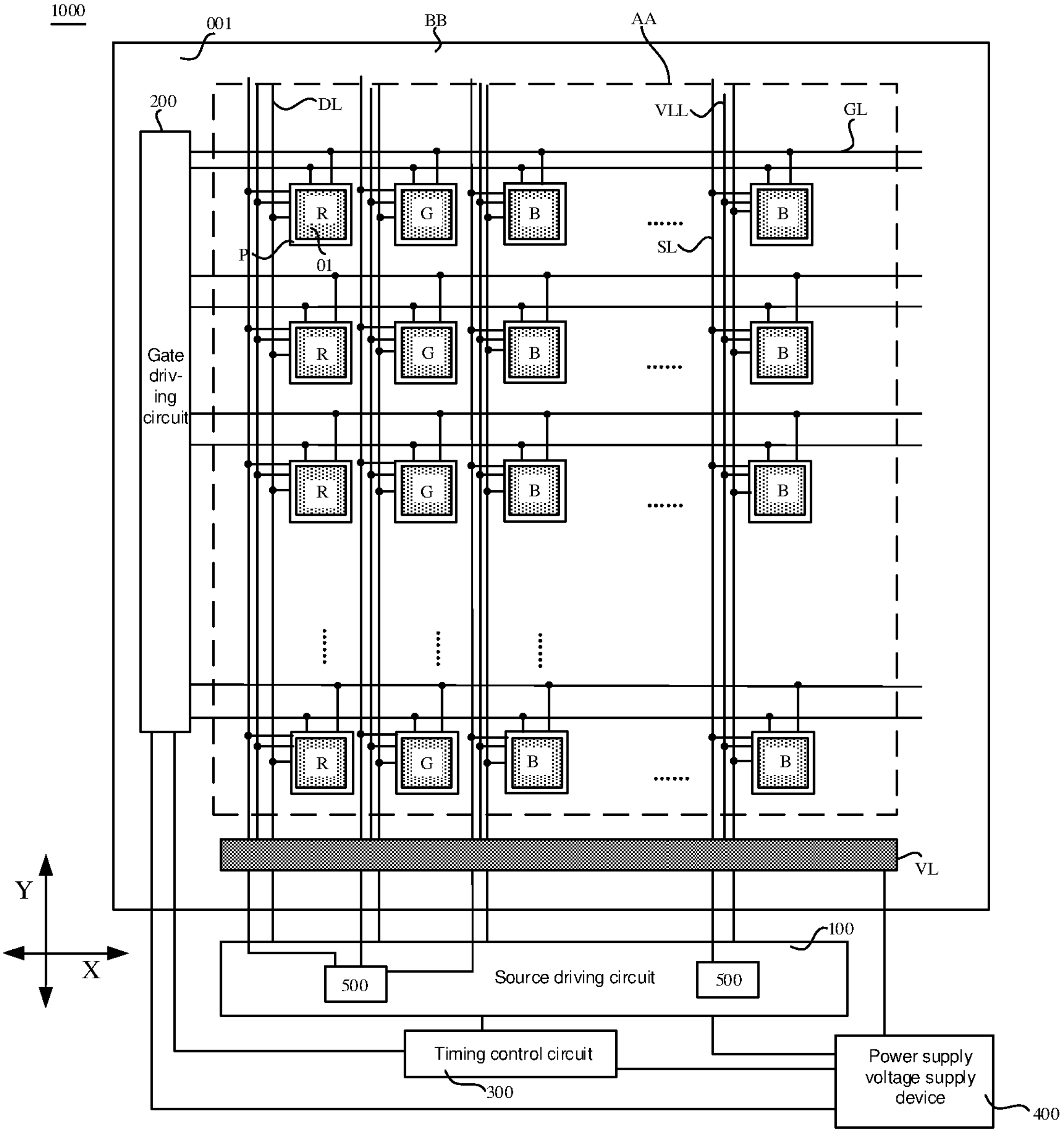
FIG. 2 is a structural diagram of another display apparatus, in accordance with some embodiments.

In some embodiments, as shown in FIG. 2, the display apparatus 1000 includes a display panel 001, a source driving circuit 100 (which may also be referred to as a data driving circuit or a source driver), a gate driving circuit 200, and a timing control circuit (TCON) 300. The timing control circuit 300 is coupled to the source driving circuit 100 and the gate driving circuit 200, the source driving circuit 100 is coupled to the display panel 001, and the gate driving circuit 200 is coupled to the display panel 001 (the gate driving circuit may be disposed in the display panel 001). The display panel 001 displays images under control of the timing control circuit 300, the source driving circuit 100 and the gate driving circuit 200.

In some embodiments, the display apparatus 1000 further includes a power supply voltage supply device 400. The power supply voltage supply device 400 is electrically connected to the display panel 001, the source driving circuit 100, the gate driving circuit 200, and the timing control circuit 300; and the power supply voltage supply device 400 is configured to: provide the display panel 001 with a power supply voltage required for operating of the display panel 001, provide the source driving circuit 100 with a power supply voltage required for operating of the source driving circuit 100, provide the gate driving circuit 200 with a power supply voltage required for operating of the gate driving circuit 200, and provide the timing control circuit 300 with a power supply voltage required for operating of the timing control circuit 300.

The display apparatus 1000 further includes a printed circuit board (PCB), a flexible printed circuit board (FPC), and other electronic components. Through the PCB and the FPC, the display panel 001 may be coupled to the source driving circuit 100 and the gate driving circuit 200, and the source driving circuit 100 and the gate driving circuit 200 may be coupled to the timing control circuit 300.

The display panel 001 may be an organic light-emitting diode (OLED) display panel, a quantum dot light-emitting diode (QLED) display panel, a micro light-emitting diode (Micro LED) display panel, etc., which is not limited in the present disclosure.

Hereinafter, the embodiments of the present disclosure are described by taking an example in which the display panel is an OLED display panel.

As shown in FIG. 2, the display panel 001 includes a display area AA (which is referred to as an active area or an active display area) and a peripheral area BB disposed around the active area AA.

The display panel 001 includes a plurality of sub-pixels P, the plurality of sub-pixels P are disposed in the display area AA, and the plurality of sub-pixels P include at least sub-pixels of a first color, sub-pixels of a second color, and sub-pixels of a third color. The first color, the second color, and the third color are three primary colors (e.g., red, green, and blue). For example, the display panel 001 may include red sub-pixels R, green sub-pixels G, and blue sub-pixels B; or the display panel 001 may include red sub-pixels R, green sub-pixels G, blue sub-pixels B, and white sub-pixels W.

In addition, the display panel 001 further includes a plurality of gate lines GL, a plurality of data lines DL, a power bus VL, and a plurality of power supply voltage signal lines VLL. The power bus VL is electrically connected to the plurality of power supply voltage signal lines VLL, and the power bus VL is electrically connected to the power supply voltage supply device 400. The power bus VL is disposed in the peripheral area BB of the display panel 001, and the plurality of power supply voltage signal lines VLL, the plurality of gate lines GL, and the plurality of data lines DL are disposed in the display area AA of the display panel 001.

For convenience of the description, the plurality of sub-pixels P in the present disclosure are described by considering an example in which the plurality of sub-pixels P are arranged in an array. In this case, a column direction of the arrangement of the plurality of sub-pixels P is a first direction Y, and a row direction of the arrangement of the plurality of sub-pixels P is a second direction X. Sub-pixels P arranged in the second direction X are sub-pixels in a same row. The plurality of gate lines GL extend in the second direction X, and the plurality of data lines DL extend in the first direction Y.

On this basis, as shown in FIG. 2, pixel driving circuits 01 located in a same row are coupled to a same gate line GL, and pixel driving circuits 01 located in a same column are coupled to a same data line DL.

Figure 3:
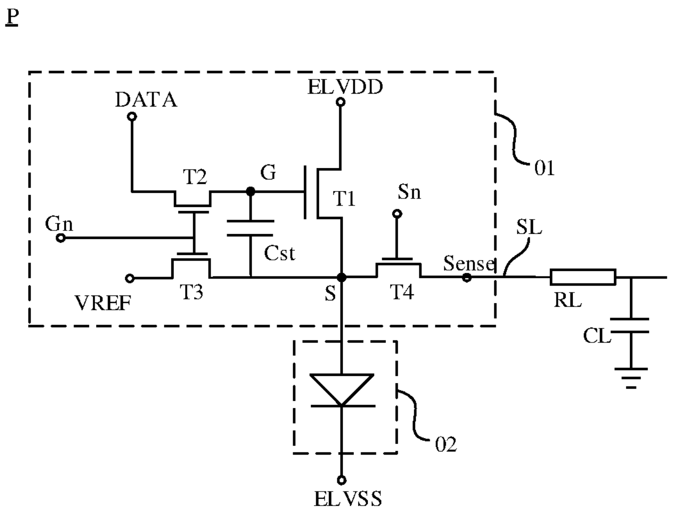
FIG. 3 is a diagram showing a structure of a pixel driving circuit, in accordance with some embodiments.

As shown in FIG. 3, each sub-pixel P includes a pixel driving circuit 01 and a first light-emitting device 02. The pixel driving circuit 01 is coupled to the first light-emitting device 02, and the pixel driving circuit 01 is configured to drive the first light-emitting device 02 to emit light. The pixel driving circuit 01 includes at least a driving transistor. The first light-emitting device 02 is, for example, an OLED.

Those skilled in the art will understand that, in addition to the driving transistor, the pixel driving circuit 01 may further include other transistor(s) and capacitor(s), which is not specifically limited in the present disclosure and may be set according to actual needs.

Here, in the process of using the display panel 001, a stability of the thin film transistor and the light-emitting device of the pixel driving circuit 01 may decrease (for example, a threshold voltage of the driving transistor shifts), which affects a display effect of the display panel 001.

For example, in the display panel 001, due to factors such as a process condition and a driving environment, the driving transistors of the pixel driving circuits 01 in all sub-pixels P may not have the same threshold voltage and the same mobility. Thus, driving currents generated by the driving transistors of the sub-pixels that are driven by the same data signal are not necessarily the same. That is, a current uniformity of the sub-pixels is poor, which causes brightness deviation of the sub-pixels, and in turn reduces a display image quality of the display panel 101. Therefore, the sub-pixels P need to be compensated.

A method for compensating the sub-pixel P may vary, which may be set according to actual needs. For example, a pixel compensation sub-circuit may be provided in the sub-pixel P, so as to perform an internal compensation on the sub-pixel P by using the pixel compensation sub-circuit. For another example, a thin film transistor of the sub-pixel P may sense the driving transistor or the light-emitting device and transmit sensed data to an external sensing circuit, and then the external sensing circuit is used to calculate a driving voltage value required for compensation and perform feedback, thereby realizing an external compensation for the sub-pixel P.

In some examples, by acquiring (detecting) the electrical properties of the driving transistor, the threshold voltage, the mobility and other parameters of the driving transistor are compensated through the external compensation. Thus, the display image quality of the display panel 101 is improved. The electrical properties of the driving transistor include an I-V characteristic of the driving transistor, where I represents the driving current generated by the driving transistor, and V represents a gate-source voltage difference of the driving transistor. The I-V characteristic of the driving transistor is related to the threshold voltage and mobility of the driving transistor.

In some embodiments, the pixel driving circuits 01 of all the sub-pixels P have the same structure. The embodiments of the present disclosure provide the pixel driving circuit 01. As shown in FIG. 3, the pixel driving circuit 01 includes a driving transistor T1, a first switching transistor T2, a second switching transistor T3, a storage capacitor Cst, and a sensing transistor T4.

For example, as shown in FIG. 3, a control electrode of the first switching transistor T2 is electrically connected to a first gate signal terminal Gn, a first electrode of the first switching transistor T2 is electrically connected to a data signal terminal DATA, and a second electrode of the first switching transistor T2 is electrically connected to a first node G. The first switching transistor T2 is configured to transmit a data signal received at the data signal terminal DATA to the first node G in response to a first gate signal received at the first gate signal terminal Gn.

A control electrode of the second switching transistor T3 is electrically connected to the first gate signal terminal Gn, a first electrode of the second switching transistor T3 is electrically connected to a reference voltage signal terminal VREF, and a second electrode of the second switching transistor T3 is electrically connected to a second node S. The second switching transistor T3 is configured to transmit a reference voltage signal received at the reference voltage signal terminal VREF to the second node S in response to the first gate signal received at the first gate signal terminal Gn.

The data signal includes, for example, a detection data signal and a display data signal.

For example, as shown in FIG. 3, a control electrode of the driving transistor T1 is electrically connected to the first node G, a first electrode of the driving transistor T2 is electrically connected to a power supply voltage signal terminal ELVDD, and a second electrode of the driving transistor T2 is electrically connected to the second node S. The driving transistor T1 is configured to: due to a voltage of the first node G and a power supply voltage signal received at the power supply voltage signal terminal ELVDD, generate a driving current and transmit the driving current to the second node S.

In some embodiments, the power supply voltage supply device 400 in the display apparatus 1000 is a fixed power supply voltage supply device; the fixed power supply voltage supply device is configured to provide the power supply voltage signal; and a voltage value of the power supply voltage signal is constant.

For example, as shown in FIG. 3, a first terminal of the storage capacitor Cst is electrically connected to the first node G, and a second terminal of the storage capacitor Cst is electrically connected to the second node S. When the first switching transistor T2 charges the first node G, the first switching transistor T2 charges the storage capacitor Cst at the same time.

For example, as shown in FIG. 3, an anode of the light-emitting device 02 is electrically connected to the second node S, and a cathode of the light-emitting device 11 is electrically connected to a first voltage signal terminal ELVSS. The light-emitting device 11 is configured to emit light due to the driving current generated by the driving transistor T1.

For example, as shown in FIG. 3, a control electrode of the sensing transistor T4 is electrically connected to a second gate signal terminal Sn, a first electrode of the sensing transistor T4 is electrically connected to the second node S, and a second electrode of the sensing transistor T4 is electrically connected to a sensing signal terminal Sense. The sensing transistor T4 is configured to acquire the driving current generated by the driving transistor T1 in response to a second gate signal received at the second gate signal terminal Sn, so as to detect electrical properties of the driving transistor T1 to realize the external compensation. The electrical properties of the driving transistor T1 include, for example, a threshold voltage and/or a carrier mobility of the driving transistor T1.

The sensing signal terminal Sense may provide an initial signal or obtain a sensing signal. The initial signal is used to reset the second node S, and the sensing signal is used to obtain the electrical properties of the driving transistor T1.

As shown in FIG. 3, a first electrode of the first light-emitting device 02 is electrically connected to the second electrode of the driving transistor T1, and a second electrode of the first light-emitting device is electrically connected to the first voltage signal terminal.

In some embodiments, first gate signal terminals Gn of pixel driving circuits 01 located in a same row are coupled to a gate line GL; second gate signal terminals Sn of the pixel driving circuits 01 located in the same row are coupled to the gate line GL, or the second gate signal terminals Sn of the pixel driving circuits 01 located in the same row are coupled to another gate line GL; and data signal terminals Data of pixel driving circuits 01 located in a same column are coupled to a data line DL.

In some embodiments, power supply voltage signal terminals ELVDD of the pixel driving circuits 01 of the plurality of sub-pixels P are coupled to the plurality of power supply voltage signal lines. For example, power supply voltage signal terminals ELVDD of the pixel driving circuits 01 located in the same row are coupled to the same power supply voltage signal line. Thus, the power supply voltage supply device provides the power supply voltage signal to all the sub-pixels P through the plurality of power supply voltage signal lines. For example, in the display apparatus shown in FIG. 2, the power supply voltage supply device is a fixed power supply voltage supply device, and the fixed power supply voltage supply device is configured to provide a fixed power supply voltage signal. During a driving period and a sensing period of the pixel driving circuit 01, the fixed power supply voltage supply device provides the fixed power supply voltage signal. A voltage of the power supply voltage signal is constant.

As shown in FIG. 2, the display panel 001 further includes a plurality of sensing signal lines SL disposed in the display area AA, and each sensing signal line SL is electrically connected to at least one sub-pixel P. For example, each sensing signal line SL is coupled to sub-pixels P in the same column. For example, each sensing signal line SL is coupled to sensing signal terminals Sense of the pixel driving circuits 01 that are located in the same column. The sensing signal line SL is configured to obtain a sensing signal of a driving transistor of a sub-pixel through a sensing transistor during the sensing period, and transmit the sensing signal of the driving transistor of the sub-pixel to a device that is coupled to the sensing signal line SL.

Figure 4:
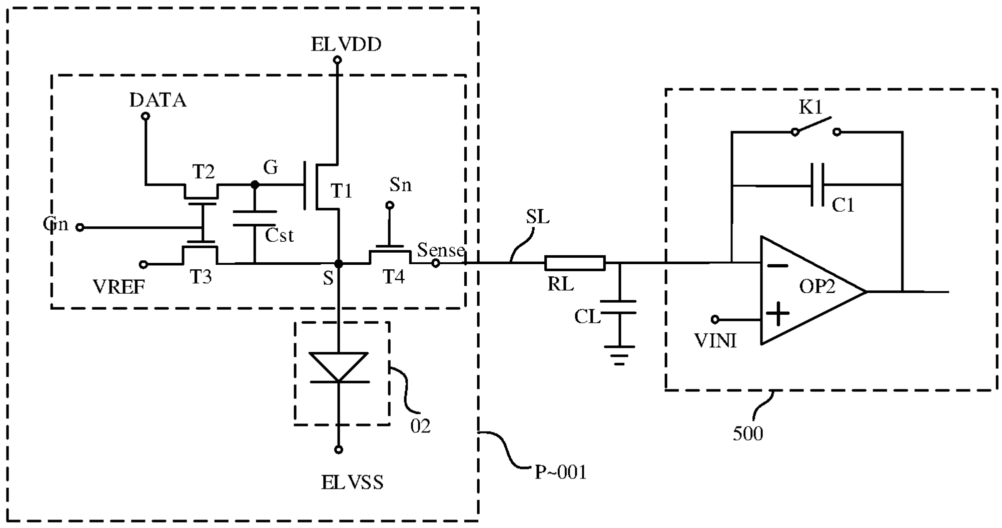
FIG. 4 is a structural diagram of a pixel driving circuit and a current detection circuit, in accordance with some embodiments.

As shown in FIG. 4, the display panel 001 further includes a parasitic resistor RL and a parasitic capacitor CL that correspond to each sensing signal line SL. In FIG. 4, the parasitic resistor RL is equivalent to a resistor connected in series in the sensing signal line SL; the parasitic capacitor CL is equivalent to a capacitor that a terminal is connected to a sensing signal line SL and another terminal is electrically connected to a grounding signal terminal.

In some embodiments, as shown in FIGS. 2 and 4, the display apparatus 1000 further includes at least one current detection circuit 500, and each current detection circuit 500 is electrically connected to at least one sensing signal line SL. The current detection circuit 500 is configured to receive a sensing signal from a sensing signal line SL, and to obtain a driving current of a driving transistor T1 of a sub-pixel P electrically connected to the sensing signal line SL according to the sensing signal.

For convenience of the description, as shown in FIG. 4, one sub-pixel P, one sensing signal line SL and one current detection circuit 500 that are connected correspondingly are taken as an example for illustration.

In some examples, the current detection circuit 500 includes a second operational amplifier OP2, an integrating capacitor C1, and a first switch K1. The second operational amplifier OP2, the integrating capacitor C1 and the first switch K1 constitute an integrator. The integrator is used to integrate the current transmitted by the sensing signal line SL, so as to generate a voltage drop and output it.

An inverting input terminal of the second operational amplifier OP2 is coupled to the sensing signal line SL. A non-inverting input terminal of the second operational amplifier OP2 is electrically connected to an initial signal terminal VINI, and the initial signal terminal VINI is configured to transmit an initial voltage signal. The inverting input terminal of the second operational amplifier OP2 is electrically connected to the sensing transistor T4 of the sub-pixel P through the sensing signal line SL.

The integrating capacitor C1 is coupled between the inverting input terminal of the second operational amplifier OP2 and an output terminal of the second operational amplifier OP2.

The first switch K1 is coupled between the inverting input terminal of the second operational amplifier OP2 and the output terminal of the second operational amplifier OP2, and the first switch K1 and the integrating capacitor C1 are connected in parallel.

When a current flows to the integrating capacitor C1 and two terminals of the integrating capacitor C1 create a voltage, a voltage output by the output terminal of the second operational amplifier OP2 starts to drop from an initial level Vini. The voltage drop is related to the integrated current.

The driving process of the pixel driving circuit 01 is exemplarily described below. In this example, a display period of a frame may include a driving period and a sensing period that are performed in sequence.

In the driving period of the display period of one frame, an operating process of the sub-pixel P may include, for example, a data writing period and a light-emitting period. Hereinafter, the circuits provided in the embodiments of the present disclosure are described by considering an example in which all transistors are N-type transistors.

In the data writing period, the first gate signal provided by the first gate signal terminal Gn is at a high level, and the display data signal provided by the data signal terminal Data is at a high level. The first switching transistor T2 is turned on under control of the first gate signal, receives the display data signal, and transmits the display data signal to the first node G and charges the storage capacitor Cst at the same time. The second switching transistor T3 is turned on under the control of the first gate signal, receives the reference voltage signal provided by the reference voltage signal terminal VREF, and transmits the reference voltage signal to the second node S and charges the storage capacitor Cst at the same time. A voltage difference of the two terminals of the storage capacitor Cst is Vdata−Vref.

In the light-emitting period, the first gate signal provided by the first gate signal terminal Gn is at a low level, and the second gate signal provided by the second gate signal terminal Sn is at a low level. The first switching transistor T2 and the second switching transistor T3 are turned off under the control of the first gate signal, and the sensing transistor T4 is turned off under control of the second gate signal. A voltage difference of the gate and the source of the driving transistor T1 is the voltage difference of the two terminals of the storage capacitor Cst, and the driving transistor generates the driving current due to the gate-source voltage difference (VGS=Vdata−Vref), and transmits the driving current to the second node S. As a result, the light-emitting device 11 emits light due to the driving current.

In the above driving period, the gate-source voltage difference of the driving transistor T1 is Vdata−Vref, Vdata is a voltage of the display data signal, and Vref is a voltage of the reference voltage signal. A voltage of the drain (the first electrode) of the driving transistor T1 is a voltage Vdd of the power supply voltage signal, a voltage of the source (the second electrode) of the driving transistor T1 is Vss+Voled, Vss is a voltage of a first voltage signal transmitted by the first voltage signal terminal ELVSS, and Voled is a voltage drop generated by the light-emitting device when the light-emitting device emits light.

In the sensing period of the display period of the frame, an operating process of the sub-pixel P may include, for example, a first period and a second period.

The first period is a writing period of the gate-source voltage difference VGS of the driving transistor. In the first period, the first gate signal provided by the first gate signal terminal Gn is at a high level. The transistor T2 and the transistor T3 are turned on under the control of the first gate signal, transmit the detection data signal Vdata' and the reference voltage signal Vref to the first node G and the second node S, respectively. The storage capacitor Cst stores the detection data signal Vdata' and the reference voltage signal Vref. At this time, the gate-source voltage difference of the driving transistor T1 is kept at Vdata'−Vref. Meanwhile, the second gate signal provided by the second gate signal terminal Sn is at a low level, and the transistor T4 is turned off.

In this period, if the first switch K1 of the current detection circuit 500 is closed, the inverting input terminal of the second operational amplifier OP2 is coupled to the output terminal of the second operational amplifier OP2. The initial signal provided by the initial signal terminal VINI is transmitted to the sensing signal line SL through the second operational amplifier OP2, and charges the sensing signal line SL. As a result, a level of the sensing signal line SL reaches the initial level Vini (which is referred to as a voltage Vini of the initial signal or an initial voltage as mentioned below).

The second period is a current sensing period of the driving transistor T1. In the second period, the first gate signal provided by the first gate signal terminal Gn is at a low level, the transistor T2 and the transistor T3 are turned off, and the gate-source voltage difference of the driving transistor T1 is kept at Vdata'-Vref. The second gate signal provided by the second gate signal terminal Sn is at a high level. At this time, the second electrode (the second node S) of the driving transistor T1 jumps to the level of the sensing signal line SL (i.e., the initial level Vini). The driving transistor T1 generates the driving current due to a drain-source voltage difference (VDS=Vdd−Vini) and the gate-source voltage difference (VGS=Vdata'−Vref). The driving current, used as a sensing current signal, flows to the sensing signal line SL through the sensing transistor T4.

In this period, the first switch K1 of the current detection circuit 500 is opened. The driving current generated by the driving transistor T1 flows to the integrating capacitor C1 of the current detection circuit 500 through the sensing transistor T4 and the sensing signal line SL. A sampling time from a time where the first switch K1 of the current detection circuit 500 is opened to a time where the voltage output by the integrator is acquired is T. Considering the driving current output by the driving transistor T1 being Ip as an example, electric charge generated by the driving transistor T1 during the sampling time T is Ip times T (Ip*T), and a voltage on the integrating capacitor C1 is Ip times T divided by C1 (Ip*T/C1). Therefore, a value of the driving current generated by the driving transistor T1 may be calculated according to a value of the voltage output by the output terminal of the second operational amplifier OP2 of the current detection circuit 500.

By setting different voltage values of the detection data signal Vdata', the driving transistor T1 has different gate-source voltage differences VGS. Driving currents output by the driving transistor T1 under the different gate-source voltage differences VGS are detected. An I-V model curve may be obtained according to the gate-source voltage differences VGS of the driving transistor T1 and the driving currents, and the threshold voltage Vth of the driving transistor of the sub-pixel is compensated according to the I-V curve.

In the above sensing period, the gate-source voltage difference of the driving transistor T1 is Vdata'-Vref; here, Vdata' is the voltage of the detection data signal, and Vref is the voltage of the reference voltage signal. The voltage of the drain (the first electrode) of the driving transistor T1 is the voltage Vdd of the power supply voltage signal, and the voltage of the source (the second electrode) of the driving transistor T1 is the initial voltage Vini of the current detection circuit 500.

Figure 5:
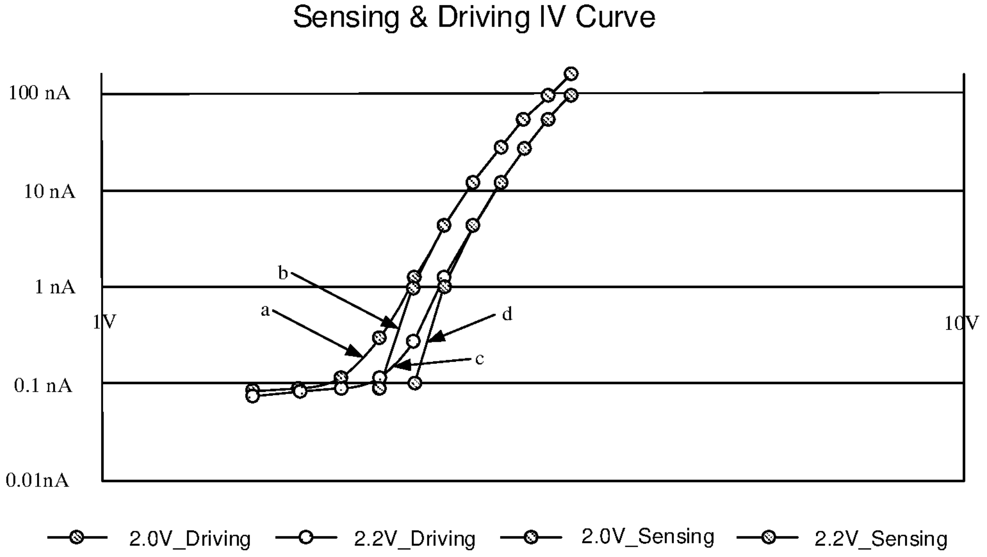
FIG. 5 is a diagram showing IV characteristic curves of a driving transistor of a pixel driving circuit, in accordance with some embodiments.

In the process of simulating the sub-pixel P and acquiring the driving current of the driving transistor T1 to obtain the electrical properties of the driving transistor T1, the inventors of the present disclosure find that, as shown in FIG. 5, an I-V curve of the driving transistor T1 in a driving state (a driving IV curve) and an I-V curve of the driving transistor T1 in a sensing state (a sensing IV curve) are inconsistent. An abscissa represents the gate-source voltage difference of the driving transistor, an ordinate represents the magnitude of the driving current generated by the driving transistor, the curve a represents the I-V curve of the driving transistor T1 in the driving state (in a case where the threshold voltage of the driving transistor T1 is 2.0 V), the curve b represents the I-V curve of the driving transistor T1 in the sensing state (in the case where the threshold voltage of the driving transistor T1 is 2.0 V), the curve c represents the I-V curve of the driving transistor T1 in the driving state (in a case where the threshold voltage of the driving transistor T1 is 2.2 V), and the curve d represents the I-V curve of the driving transistor T1 at the sensing state (in the case where the threshold voltage of the driving transistor T1 is 2.2 V). It can be seen that, in a case where the threshold voltages of the driving transistors T1 are same, the I-V curve of the driving transistor T1 in the driving state and the I-V curve of the driving transistor T1 in the sensing state have a large deviation. In particular, in a case where the driving current is small (which is referred to as a small current below), data of the driving current of the driving transistor T1 in the sensing state cannot accurately reflect data of the driving current in the driving state. Therefore, the electrical properties of the driving transistor T1 obtained according to the I-V curve are inaccurate. In this way, a problem of a poor compensation effect of the sub-pixel at a small current may occur.

Figure 6:
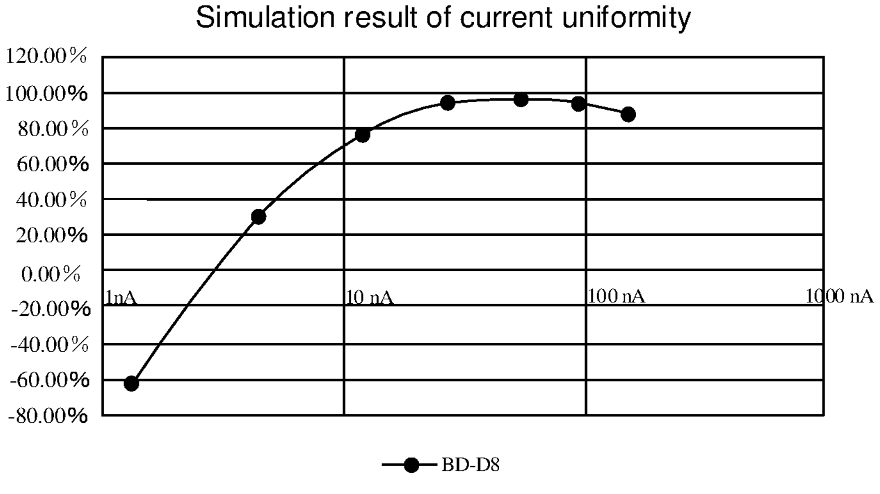
FIG. 6 is a schematic diagram showing a simulation result of current uniformity of a plurality of sub-pixels of a display panel after compensation, in accordance with some embodiments.

For example, as shown in FIG. 6, from the simulation result of the current uniformity of the sub-pixels in the display panel after the threshold voltages (from 1.6 V to 2.4 V) of the driving transistors are compensated based on the above two models, it can be seen that, in a case where the driving current is above 20 nA, the current uniformity can reach 90% or more, and the compensation effect is good; and in a case where the driving current is in a range from 1 nA to 10 nA, the current uniformity decreases to a range from 70% to below 30%, and the compensation effect is poor.

The inventors of the present disclosure have found that the reason for the above problem is as follows. In the above driving period, the gate-source voltage difference of the driving transistor T1 is Vdata−Vref, Vdata is the voltage of the display data signal, and Vref is the voltage of the reference voltage signal; the voltage of the drain (the first electrode) of the driving transistor T1 is the voltage Vdd of the power supply voltage signal, the voltage of the source (the second electrode) of the driving transistor T1 is Vss+Voled, Vss is the voltage of the first voltage signal transmitted by the first voltage signal terminal ELVSS, and Voled is the voltage drop generated by the light-emitting device when the light-emitting device emits light; and the drain-source voltage difference of the driving transistor T1 is Vdd−(Vss+Voled).

In the above sensing period, the gate-source voltage difference of the driving transistor T1 is Vdata'−Vref, Vdata' is the voltage of the detection data signal, and Vref is the voltage of the reference voltage signal; the voltage of the drain (the first electrode) of the driving transistor T1 is the voltage Vdd of the power supply voltage signal, and the voltage of the source (the second electrode) of the driving transistor T1 is the voltage Vini of the initial signal; and the drain-source voltage difference of the driving transistor T1 is Vdd−Vini.

It can be seen that, the source voltage and the drain-source voltage difference of the driving transistor in the driving period are different from the source voltage and the drain-source voltage difference of the driving transistor in the sensing period, respectively. That is, an operating point of the driving transistor in the sensing state and the operating point of the driving transistor in the driving state are different, which causes the problem of the poor compensation effect of the sub-pixel at the small current. The operating points of the driving transistor include the voltage of the gate of the driving transistor, the voltage of the source of the driving transistor, the voltage of the drain of the driving transistor, the gate-source voltage difference of the driving transistor, and a source-drain voltage difference of the driving transistor.

The inventors of the present disclosure have known from verification that, if the drain-source voltage difference of the driving transistor in the driving period and the drain-source voltage difference of the driving transistor in the sensing period are adjusted to be consistent, the current uniformity of the sub-pixels will be significantly improved after the sub-pixels are compensated.

In light of this, in order to improve the current uniformity after the external compensation, the inventors of the present disclosure adopts a method as follows: by adjusting the voltage of the source or the voltage of the drain of the driving transistor in different states, the operating points of the driving transistor T1 remain the same in the sensing state and in the driving state.

Figure 7:
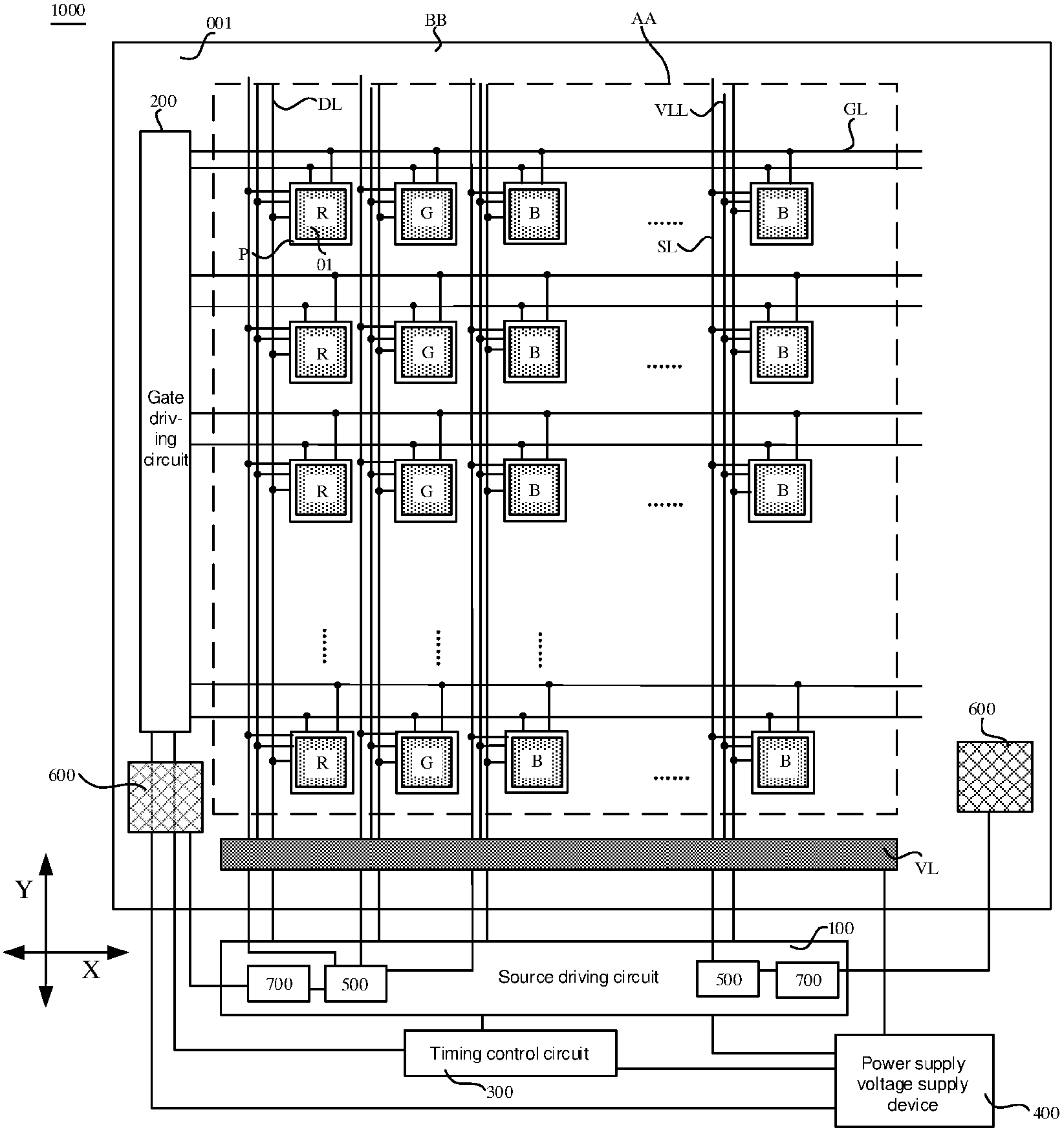
FIG. 7 is a structural diagram of yet another display apparatus, in accordance with some embodiments.
Figure 8:
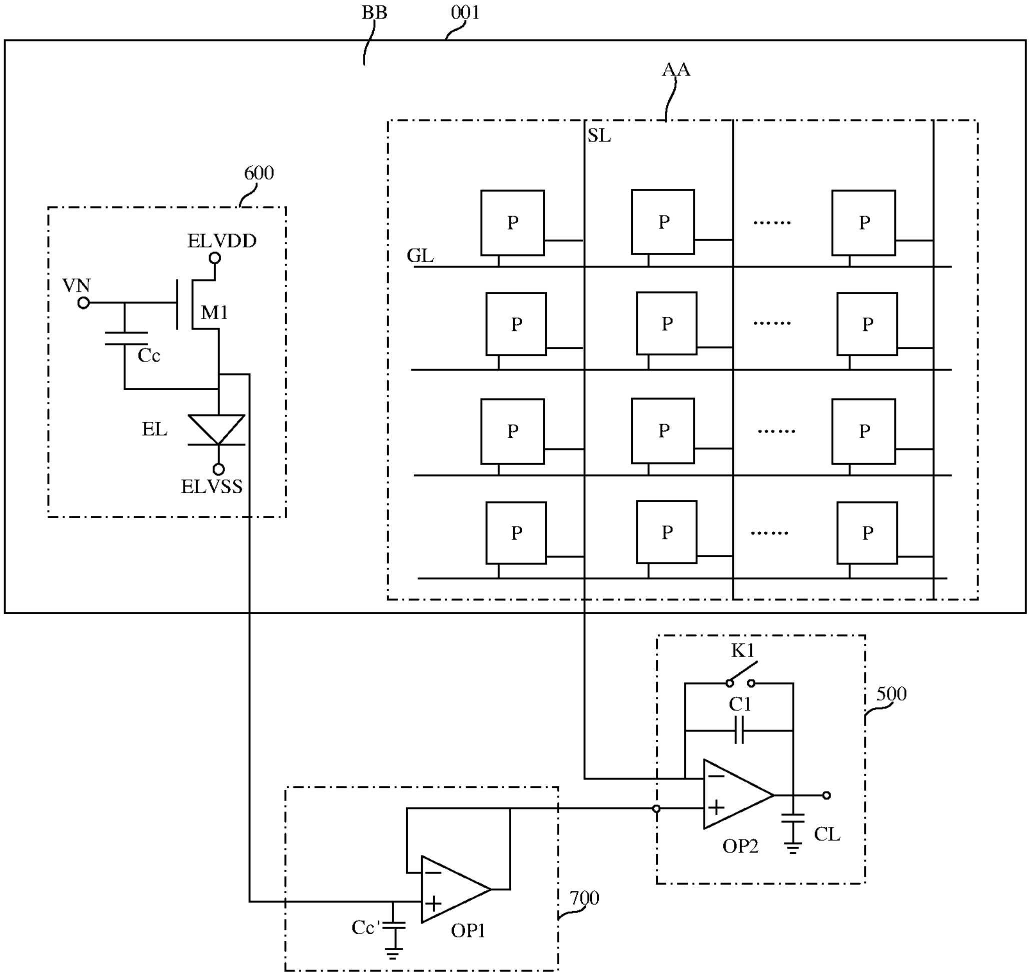
FIG. 8 is a schematic diagram showing connections of a set voltage generation circuit, a set voltage follower circuit, a current detection circuit and a plurality of sub-pixels, in accordance with some embodiments.

As shown in FIGS. 7 and 8, in some embodiments, the display panel 001 further includes at least one set voltage generation circuit 600. An output terminal of each set voltage generation circuit 600 is electrically connected to a sensing signal terminal of at least one sub-pixel P. For example, the output terminal of each set voltage generation circuit 600 is electrically connected to the current detection circuit. For example, the output terminal of each set voltage generation circuit 600 is electrically connected to the non-inverting input terminal of the second operational amplifier of the current detection circuit 500, and the current detection circuit 500 is electrically connected to the sensing signal terminal of the at least one sub-pixel P through the sensing signal line SL. In this way, the set voltage generation circuit 600 is electrically connected to first electrodes of sensing transistors T4 of the sub-pixel(s) P.

The set voltage generation circuit 600 is configured to generate a set voltage signal, and to transmit the set voltage signal to the sensing transistor T4 of the sub-pixel P and the second electrode of the driving transistor T1 of the sub-pixel P in the sensing period, so as to make the operating point(s) of the driving transistor T1 of the sub-pixel P maintain consistent in the sensing period and the driving period. For example, the set voltage generation circuit 600 is electrically connected to the non-inverting input terminal of the second operational amplifier of the current detection circuit 500, so that the initial signal provided by the initial signal terminal VINI of the current detection circuit 500 in FIG. 4 is replaced with the set voltage signal generated by the set voltage generation circuit 600. A voltage of the set voltage signal is equal to or substantially equal to the voltage of the second electrode of the driving transistor T1 of the sub-pixel P electrically connected to the set voltage generation circuit 600 in the driving period.

For example, in the first period of the sensing period, the set voltage generation circuit 600 transmits the set voltage signal to the current detection circuit 500, the first switch K1 of the current detection circuit 500 is closed, so as to form a follower. The voltage V1 of the set voltage signal serves as the initial voltage to reset a voltage of the sensing signal line SL. At this time, the voltage of the sensing signal line SL is equal to the voltage V1 of the set voltage signal. In a case where the sensing transistor T4 is turned on, the source of the driving transistor T1 is clamped on the voltage of the sensing signal line SL, that is, the voltage V1 of the set voltage signal.

In the driving period of the sub-pixel P, the drain-source voltage difference of the driving transistor T1 is Vdd−(Vss+Voled). In the sensing period of the sub-pixel P, the drain-source voltage difference of the driving transistor T1 is Vdd−V1. Since the voltage V1 of the set voltage signal is equal to or substantially equal to the voltage (Vss+Voled) of the second electrode of the driving transistor T1 of the sub-pixel P in the driving period, the drain-source voltage difference (Vdd−(Vss+Voled)) of the driving transistor T1 in the driving state is equal to the drain-source voltage difference (Vdd−V1) of the driving transistor T1 in the sensing state. Therefore, it is ensured that the operating points of the driving transistor T1 of the sub-pixel P maintain consistent in the sensing period and the driving period.

In this way, the set voltage generation circuit 600 is provided, the output terminal of the set voltage generation circuit 600 is electrically connected to the sensing signal terminal of the at least one sub-pixel P, the set voltage signal generated by the set voltage generation circuit 600 is transmitted to the sensing transistor T4 of the sub-pixel P in the sensing period, and the voltage of the set voltage signal is equal to the voltage of the second electrode of the driving transistor T1 of the sub-pixel P electrically connected to the set voltage generation circuit 600 in the driving period. It can be seen from the above analysis that the operating points of the driving transistor T1 of the sub-pixel P can maintain consistent in the sensing period and the driving period. For example, the drain-source voltage difference of the driving transistor T1 of the sub-pixel P maintain consistent in the sensing period and the driving period, and the data of the driving current of the driving transistor T1 in the sensing state can accurately reflect the data of the driving current of the driving transistor T1 in the driving state, which improves a coincidence degree of the I-V curve of the driving transistor T1 in the sensing state and the I-V curve of the driving transistor T1 in the driving state. As a result, it may be possible to improve the accuracy of the electrical properties of the driving transistor T1 obtained according to the I-V curve, and in turn ensure the compensation effect of the sub-pixel P.

In some embodiments, as shown in FIG. 8, the set voltage generation circuit 600 includes a first transistor M1, a first storage capacitor Cc, and a second light-emitting device EL.

A control electrode of the first transistor M1 is configured to receive a control voltage signal. The control electrode of the first transistor M1 is electrically connected to a control voltage signal terminal VN, a first electrode of the first transistor M1 is electrically connected to a power supply voltage signal terminal, and a second electrode of the first transistor M1 is electrically connected to a first electrode of the second light-emitting device EL. The first transistor M1 is configured to: in response to the control voltage signal, generate a driving current due to a power supply voltage signal received at the power supply voltage signal terminal, and transmit the driving current to the second light-emitting device EL. The driving current flowing through the second light-emitting device causes a voltage drop. A voltage of the first electrode of the second light-emitting device EL is close to a voltage of the first electrode of the first light-emitting device when the driving transistor of the pixel driving circuit drives the first light-emitting device.

A first electrode of the first storage capacitor Cc is electrically connected to the control electrode of the first transistor M1, and a second electrode of the first storage capacitor Cc is electrically connected to the second electrode of the first transistor M1. The first storage capacitor Cc is configured to receive the control voltage signal and store it.

The second electrode of the second light-emitting device EL is electrically connected to a first voltage signal terminal.

The first electrode of the second light-emitting device EL is used as the output terminal of the set voltage generation circuit 600, the driving current output by the second electrode of the first transistor M1 flowing through the second light-emitting device EL causes the voltage drop, and a voltage signal of the first electrode of the second light-emitting device EL is the set voltage signal.

The power supply voltage signal transmitted by the power supply voltage signal terminal electrically connected to the first transistor M1 and the power supply voltage signal transmitted by the power supply voltage signal terminal electrically connected to the driving transistor T1 of the sub-pixel P are the same power supply voltage signal. The first voltage signal terminal electrically connected to the second light-emitting device EL and the first voltage signal terminal electrically connected to the first light-emitting device of the sub-pixel P are the same voltage signal terminal, e.g., are both low voltage signal terminals.

For example, the control voltage signal is a voltage signal generated by a voltage generation device of the display apparatus. The voltage of the control voltage signal is equal to or substantially equal to the voltage of the display data signal received by the pixel driving circuit of the sub-pixel P electrically connected to the set voltage generation circuit 600. A light-emitting brightness of the second light-emitting device EL is equal to or substantially equal to a light-emitting brightness of the first light-emitting device of the sub-pixel P electrically connected to the set voltage generation circuit 600. Therefore, the driving current generated by the first transistor M1 is equal to or approximately equal to the driving current generated by the driving transistor T1, and a voltage of the second electrode of the first transistor M1 is equal to or approximately equal to the voltage of the second electrode of the driving transistor T1. In this way, it may be possible to ensure that the voltage of the set voltage signal is equal to or approximately equal to the voltage of the second electrode of the driving transistor T1 of the sub-pixel P electrically connected to the set voltage generation circuit 600 in the driving period, so that the set voltage signal is transmitted to the sensing signal terminal of the sub-pixel P in the sensing period. As a result, a positive effect of the set voltage signal on the accuracy of the compensation of the sub-pixel P is improved.

In some embodiments, in the set voltage generation circuit 600 and the sub-pixel P that are electrically connected to each other, electrical properties of the first transistor M1 are consistent with the electrical properties of the driving transistor T1.

For example, electrical properties of a transistor include a threshold voltage and a mobility of the transistor. In the set voltage generation circuit 600, the first transistor M1 with the same electrical properties as the driving transistor T1 is selected. In this way, under the same voltage, the driving current generated by the first transistor M1 is closer to the driving current generated by the driving transistor T1. Therefore, it may ensure that the voltage of the set voltage signal is equal to or substantially equal to the voltage of the second electrode of the driving transistor T1 of the sub-pixel P electrically connected to the set voltage generation circuit 600 in the driving period.

In some embodiments, in the set voltage generation circuit 600 and the sub-pixel P that are electrically connected to each other, the electrical properties of the second light-emitting device EL are consistent with the electrical properties of the first light-emitting device.

For example, electrical properties of a light-emitting device are properties that affect performance and light-emitting brightness of the light-emitting device. For example, the electrical properties of the light-emitting device include a structure of the light-emitting device, a material of the light-emitting layer, a type of carriers, and a transmission mechanism of the carriers. In the set voltage generation circuit 600, the second light-emitting device EL with the same electrical properties of the first light-emitting device is selected. In this way, under the same driving current, the light-emitting brightness of the second light-emitting device EL is the same as the light-emitting brightness of the first light-emitting device. Therefore, it may ensure that the voltage of the set voltage signal is equal to or substantially equal to the voltage of the second electrode of the driving transistor T1 of the sub-pixel P electrically connected to the set voltage generation circuit 600 in the driving period.

In some embodiments, as shown in FIGS. 7 and 8, the set voltage generation circuit 600 is disposed in the peripheral area BB, and the plurality of sub-pixels P are disposed in the display area AA. The set voltage generation circuit 600 includes the first transistor M1, the first storage capacitor Cc and the second light-emitting device EL. The sub-pixels P each include the driving transistor T1, the first switching transistor T2, the second switching transistor T3, the storage capacitor Cst and the sensing transistor T4. The process of forming the devices included in the set voltage generation circuit 600 is same as the process of forming the sub-pixels P, thereby simplifying the process and saving processes.

In some examples, the display panel 001 further includes a light-shielding layer disposed on a side of the set voltage generation circuit 600 proximate to a display surface of the display panel 001. Therefore, when the set voltage generation circuit 600 operates, the light emitted by the second light-emitting device EL is blocked, and the peripheral area BB of the display panel 001 does not emit light, which avoids the normal display of the display area AA of the display panel 001 from being affected.

In some embodiments, as shown in FIGS. 7 and 8, the display apparatus 1000 further includes at least one set voltage follower circuit 700. The set voltage follower circuit 700 is used to stabilize the set voltage signal that is input to the current detection circuit, thereby reducing noise and improving current detection accuracy. An input terminal of each set voltage follower circuit 700 is electrically connected to an output terminal of a set voltage generation circuit 600, and an output terminal of each set voltage follower circuit 700 is electrically connected to at least one current detection circuit 500. The set voltage signal generated by the set voltage generation circuit 600 is input to the current detection circuit 500 through the set voltage follower circuit 700, and the set voltage signal is transmitted to the sense signal line SL through the current detection circuit 500.

The set voltage follower circuit 700 is configured to: receive the set voltage signal output by the set voltage generation circuit 600, perform filtering process on the set voltage signal, and transmit a processed set voltage signal to the input terminal of the current detection circuit 500 as the initial signal.

As shown in FIGS. 7 and 8, in the display apparatus 1000 provided in the embodiments of the present disclosure, a connection relationship between the at least one current detection circuit 500, the at least one set voltage follower circuit 700, and the plurality of sub-pixels P is as follows: each current detection circuit 500 is electrically connected to at least one sensing signal line SL, and each set voltage generation circuit 600 is electrically connected to at least one current detection circuit 500.

The at least one set voltage follower circuit 700 is provided, and each set voltage follower circuit 700 is electrically connected to the set voltage generation circuit 600 to filter the set voltage signal. For example, the set voltage follower circuit 700 performs filtering and amplification process on the acquired set voltage signal to remove clutter in the set voltage signal, so that the processed set voltage signal is more accurate, and the voltage of the set voltage signal is closer to the voltage of the second electrode of the driving transistor of the sub-pixel electrically connected to the set voltage generation circuit 600 in the driving period.

In some embodiments, as shown in FIG. 8, the set voltage follower circuit 700 includes a first operational amplifier OP1 and a second storage capacitor Cc'. A non-inverting input terminal of the first operational amplifier OP1 is electrically connected to the output terminal of the set voltage generation circuit. An inverting input terminal of the first operational amplifier OP1 is electrically connected to an output terminal of the first operational amplifier OP1, and the output terminal of the first operational amplifier OP1 is used as an output terminal of the set voltage follower circuit 700. A first electrode of the second storage capacitor Cc' is electrically connected to the non-inverting input terminal of the first operational amplifier OP1, and a second electrode of the second storage capacitor Cc' is electrically connected to a second voltage signal terminal. For example, the second voltage signal terminal is a grounding signal terminal.

In some embodiments, as shown in FIG. 7, the source driver included in the display apparatus is electrically connected to the display panel, and is electrically connected to the plurality of sub-pixels through the plurality of data lines DL. The at least one current detection circuit 500 and the at least one set voltage follower circuit 700 are integrated in the source driver.

In some embodiments, as shown in FIG. 7, in the display panel 001, the output terminal of the set voltage generation circuit 600 is electrically connected to at least one sensing signal line SL, and the output terminal of the set voltage generation circuit 600 is electrically connected to a sensing signal terminal of at least one sub-pixel through a sensing signal line SL.

For example, each sensing line is electrically connected to a sensing signal terminal of at least one sub-pixel, and each set voltage generation circuit 600 is electrically connected to at least one sensing signal line SL, so that each set voltage generation circuit 600 is electrically connected to at least one sub-pixel.

In the display apparatus 1000, each current detection circuit 500 is electrically connected to at least one sense signal line SL, each set voltage generation circuit 600 is electrically connected to a single set voltage follower circuit 700, and each set voltage follower circuit 700 is electrically connected to at least one current detection circuit 500.

An electrical connection relationship between the set voltage generation circuit 600 and the sub-pixels is exemplarily described below.

In some examples, the plurality of sub-pixels includes at least sub-pixels of three colors; the display panel includes at least three set voltage generation circuits 600, each set voltage generation circuit 600 is electrically connected to sub-pixels of a same color; and color of light emitted by the second light-emitting device of the set voltage generation circuits 600 is the same as color of light emitted by the first light-emitting devices of the sub-pixels electrically connected to the set voltage generation circuits 600.

Figure 9:
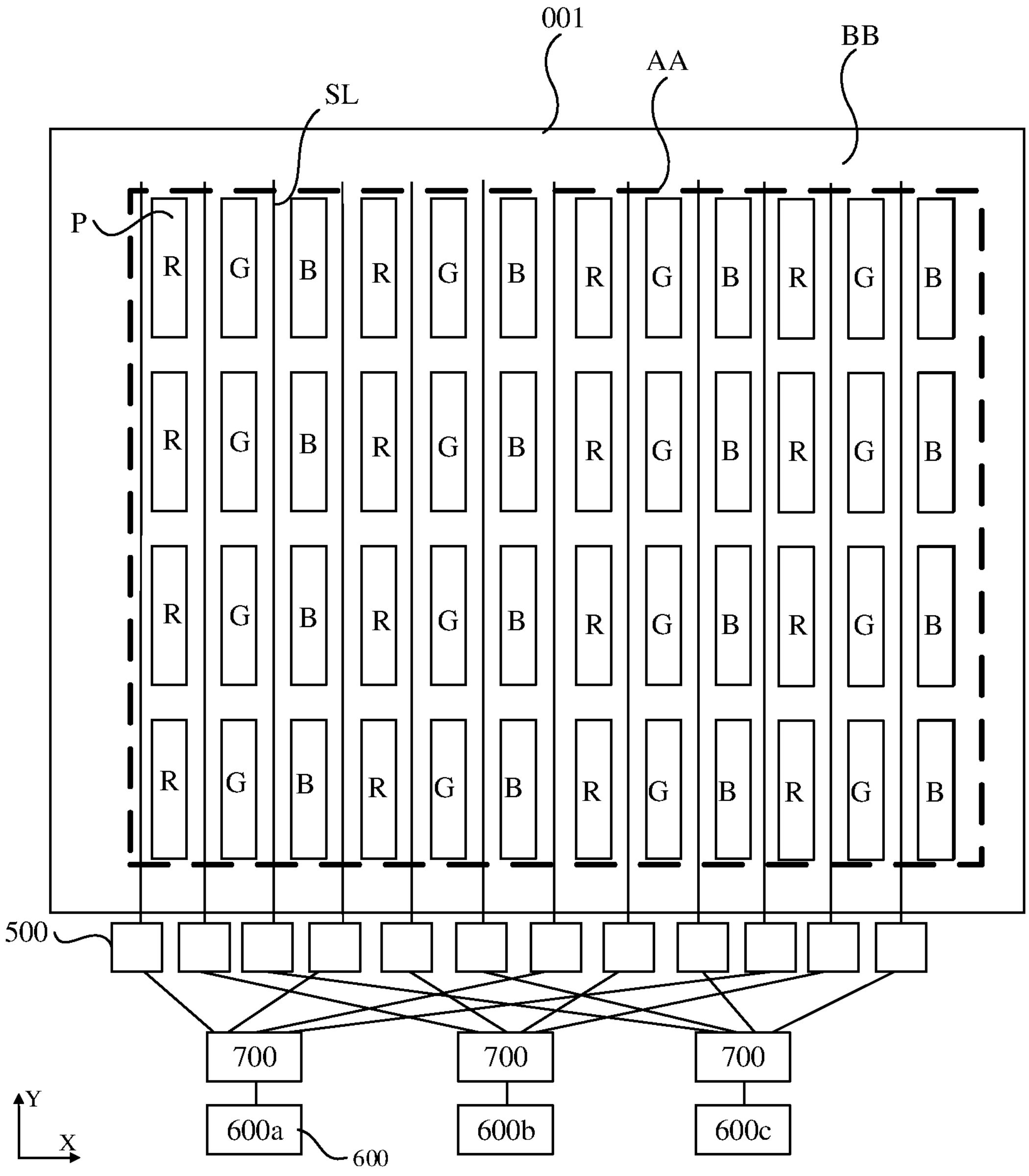
FIG. 9 is a schematic diagram showing connections of a set voltage generation circuit, a set voltage follower circuit, a current detection circuit and a plurality of sub-pixels, in accordance with some other embodiments.

For example, as shown in FIG. 9, the plurality of sub-pixels P includes sub-pixels of the first color, sub-pixels of the second color, and sub-pixels of the third color (e.g., red sub-pixels R, green sub-pixels G, and blue sub-pixels B). The display panel includes three set voltage generation circuits 600, and the three set voltage generation circuits 600 are a first set voltage generation circuit 600*a*, a second set voltage generation circuit 600*b*, and a third set voltage generation circuit 600*c*. The first set voltage generation circuit 600*a* is electrically connected to the sub-pixels of the first color (the red sub-pixels R), the second set voltage generation circuit 600*b* is electrically connected to the sub-pixels of the second color (the green sub-pixels G), and the third set voltage generation circuit 600*c* is electrically connected to the sub-pixels of the third color (the blue sub-pixels B).

In a case where the display panel includes three set voltage generation circuits 600, there are three set voltage follower circuits 700 included in the display apparatus 1000.

In some examples, as shown in FIG. 9, the plurality of sub-pixels are arranged in an array. For example, the plurality of sub-pixels are arranged in N rows and M columns. Sub-pixels in a same column are sub-pixels of the same color. For example, in the second direction X, a plurality of columns of sub-pixels are sequentially arranged in an order of a column of red sub-pixels, a column of green sub-pixels and a column of blue sub-pixels, and each sensing signal line SL is electrically connected to a same column of sub-pixels. Each set voltage generation circuit 600 is electrically connected to sensing signal lines SL, and the sensing signal lines SL are electrically connected to sub-pixels of the same color. That is, the display panel includes (M/3) columns of red sub-pixels, (M/3) columns of green sub-pixels and (M/3) columns of blue sub-pixels; the first set voltage generation circuit 600*a* is electrically connected to the (M/3) columns of red sub-pixels through (M/3) sensing signal lines SL; the second set voltage generation circuit 600*b* is electrically connected to the (M/3) columns of green sub-pixels through (M/3) sensing signal lines SL; and the third set voltage generation circuit 600*c* is electrically connected to the (M/3) columns of blue sub-pixels through (M/3) sensing signal lines SL. As a result, each set voltage generation circuit 600 transmits the generated set voltage signal to pixel driving circuits of sub-pixels corresponding thereto, so as to bias the pixel driving circuits in the sensing period.

As shown in FIG. 9, in some embodiments, the number of current detection circuits 500 included in the display apparatus 1000 is M. Each current detection circuit 500 is electrically connected to a column of sub-pixels corresponding to a sensing signal line SL through the sensing signal line SL. In the display panel, the number of columns of sub-pixels of the same color is M/3, current detection circuits 500 electrically connected to the (M/3) columns of sub-pixels of the same color are classified into one group, and the number of current detection circuits 500 in each group is M/3. Each set voltage follower circuit 700 is electrically connected to a single group of current detection circuits 500, and each set voltage follower circuit 700 is electrically connected to a single set voltage generation circuit 600, so that each set voltage generation circuit 600 is electrically connected to (M/3) columns of sub-pixels of the same color.

It will be noted that, FIG. 9 illustrates only the electrical connection relationship between the set voltage generation circuits 600, the current detection circuits 500, the set voltage follower circuits 700 and the sub-pixels P, but does not show actual structures. In some embodiments of the present disclosure, the set voltage generation circuits 600 are disposed in the peripheral area BB of the display panel 001.

Some embodiments of the present disclosure further provide a current sensing method of a pixel driving circuit of a display apparatus, the current sensing method is applied to the display apparatus 1000 as shown in FIG. 7. In a case where the display panel 001 included in the display apparatus includes at least one set voltage generation circuit 600, and the set voltage generation circuit 600 includes a first transistor M1, a first storage capacitor, and a second light-emitting device EL, the current sensing method includes S1 to S3.

In S1, the first transistor M1 of the set voltage generation circuit 600 receives a control voltage signal and a power supply voltage signal, and generates a driving current due to the control voltage signal and the power supply voltage signal. A voltage of the control voltage signal is obtained according to a corresponding relationship between a target brightness of a first light-emitting device 02 of a sub-pixel P to be detected and a voltage value of a control electrode of a driving transistor T1 of the sub-pixel P to be detected.

A first light-emitting device 02 of a sub-pixel P has a target brightness. For example, the target brightness of the first light-emitting device 02 is a brightness corresponding to a target grayscale of the sub-pixel P. The target brightness corresponds to a driving current with a specific current value. That is, a driving current generated by a driving transistor T1 has a target current value, and a voltage of a display data signal provided to the sub-pixel P may be determined according to a relationship between the driving current and a gate-source voltage difference of the driving transistor. Therefore, in the set voltage generation circuit 600, the voltage of the control voltage signal received by the first transistor M1 is equal to the voltage of the display data signal. As a result, the driving current generated by the first transistor M1 is consistent with the driving current generated by the driving transistor T1 of the sub-pixel P, and a brightness of the second light-emitting device EL when the second light-emitting device EL emits light is consistent with the target brightness of the first light-emitting device 02.

In some examples, the brightness of the second light-emitting device EL may be detected by a brightness tester; and the brightness of the second light-emitting device EL is changed by adjusting the voltage of the control voltage signal, so that the brightness of the second light-emitting device EL is consistent with the brightness corresponding to the target grayscale of the sub-pixel P. In this way, the driving current generated by the first transistor M1 of the voltage generation circuit 600 is equal to the driving current generated by the driving transistor T1 of the sub-pixel P in the driving period. Therefore, the voltage of the set voltage signal obtained according to the driving current generated by the driving transistor T1 is closer to the voltage of the second electrode of the driving transistor T1 of the sub-pixel P in the driving period.

In S2, the set voltage generation circuit 600 outputs a set voltage signal according to the driving current generated by the driving transistor T1.

In S3, a current detection circuit 500 receives the set voltage signal, and transmits the set voltage signal to a sensing signal terminal of a sub-pixel P electrically connected to the current detection circuit 500 in the sensing period.

In some embodiments, in a case where the display apparatus further includes at least one set voltage follower circuit 700, the current sensing method further includes S2-1 after S2.

In S2-1, the set voltage follower circuit 700 receives the set voltage signal, performs filtering process on the set voltage signal, and outputs the processed set voltage signal.

S3 includes: the current detection circuit 500 receiving the set voltage signal that has undergone the process and transmitting the processed set voltage signal to the sensing signal terminal of the sub-pixel P electrically connected to the current detection circuit 500 in the sensing period.

Figure 10:
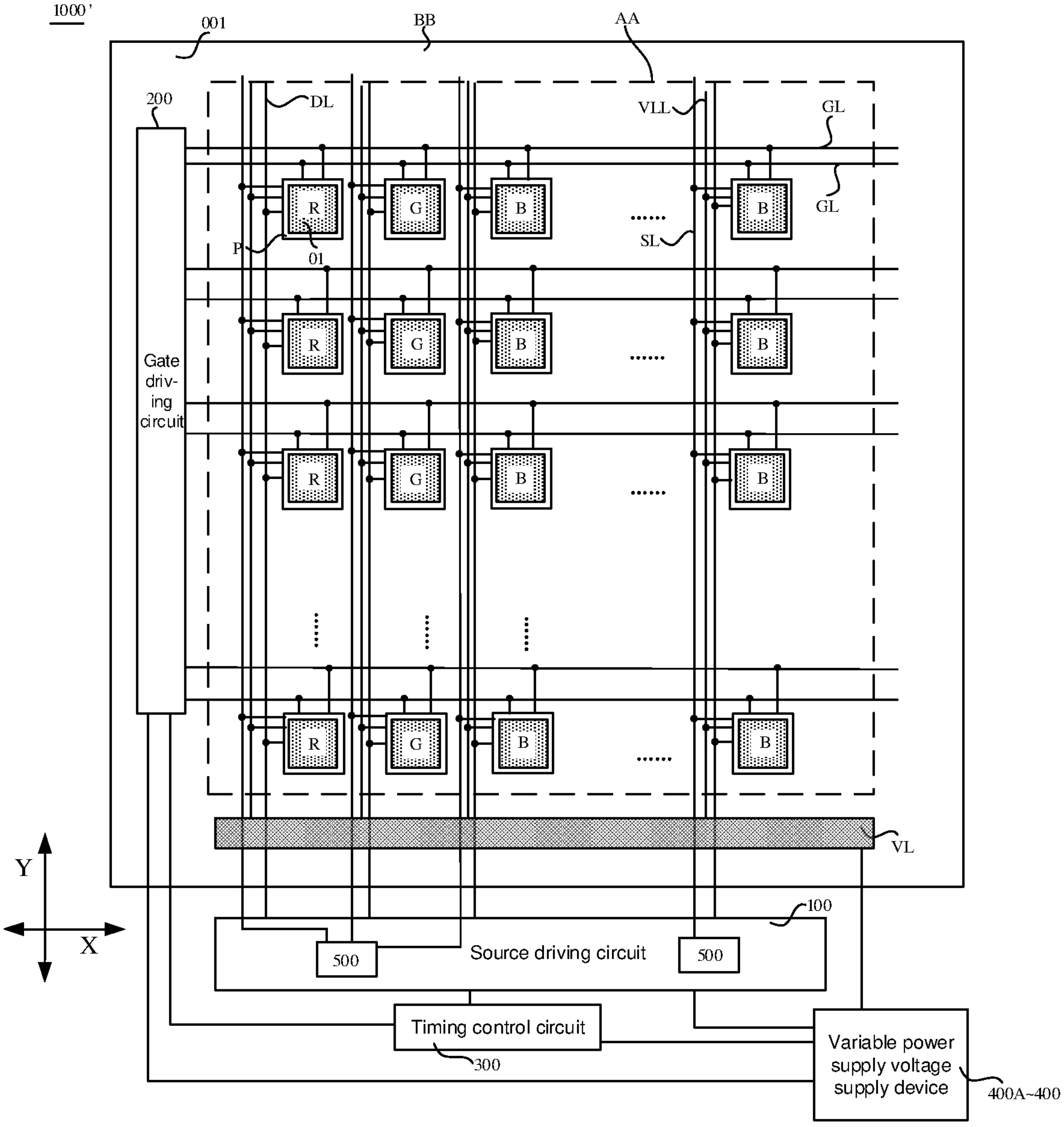
FIG. 10 is a structural diagram of yet another display apparatus, in accordance with some embodiments.

Some embodiments of the present disclosure further provide another display apparatus 1000'. As shown in FIG. 10, the display apparatus 1000' includes a display panel 001, a source driving circuit 100, a gate driving circuit 200, and a timing control circuit 300. As for the connection relationship between the display panel 001, the source driving circuit 100, the gate driving circuit 200 and the timing control circuit 300, reference may be made to the above description, and details will not be repeated here.

The display apparatus 1000' further includes at least one current detection circuit.

The display panel 001 includes a plurality of sub-pixels P, a plurality of gate lines GL, a plurality of data lines DL, a plurality of sensing signal lines SL, a power bus, and a plurality of power voltage signal lines. As for the structures and arrangements of the plurality of sub-pixels P, the plurality of gate lines GL, the plurality of data lines DL, and the plurality of sensing signal lines SL, reference may be made to the above description, and details will not be repeated here.

Each sub-pixel P includes a pixel driving circuit 01 and a first light-emitting device 02. As for the structures and the driving processes of the pixel driving circuit 01 and the first light-emitting device 02, reference may be made to the above description. In a case where the sub-pixel P is compensated by using the external compensation manner, a problem of a poor compensation effect of the sub-pixel at a small current occurs, and details of analysis may be referred to the above description.

In some embodiments, the display apparatus 1000' further includes a power supply voltage supply device, and the power supply voltage supply device is a variable power supply voltage supply device 400A. The variable power supply voltage supply device 400A is electrically connected to the first electrode of the driving transistor of the sub-pixel through the power supply voltage signal terminal.

For example, the variable power supply voltage supply device 400A is electrically connected to the power bus VL. The power bus VL is electrically connected to the plurality of power supply voltage signal lines VLL. Each power supply voltage signal line VLL is electrically connected to a column of sub-pixels P. For example, each power supply voltage signal line VLL is electrically connected to power supply voltage signal terminals of a column of sub-pixels.

The variable power supply voltage supply device 400A is configured to provide a variable power supply voltage signal. That is, a voltage of the variable power supply voltage signal is variable. The variable power supply voltage supply device 400A provides a first power supply voltage signal to the sub-pixels in the driving period, and provides a second power supply voltage signal to the sub-pixels in the sensing period. Thus, the operating point of the driving transistor of the sub-pixel maintains consistent in the sensing period and the driving period.

A relationship between a voltage Vdd2 of the second power supply voltage signal, a voltage Vdd1 of the first power supply voltage signal, the voltage V2 of the second electrode of the driving transistor in the driving period, and a voltage Vini of an initial signal is: Vdd2=Vini+(Vdd1−V2).

Referring to the above description of the driving process of the pixel driving circuit, in the driving period, the gate-source voltage difference of the driving transistor T1 is Vdata−Vref, Vdata is the voltage of the display data signal, and Vref is the voltage of the reference voltage signal; the voltage of the drain (the first electrode) of the driving transistor T1 is the voltage Vdd1 of the first power supply voltage signal, the voltage V2 of the source (the second electrode) of the driving transistor T1 is Vss+Voled, Vss is the voltage of the first voltage signal transmitted by the first voltage signal terminal ELVSS, and Voled is the voltage drop generated by the light-emitting device when the light-emitting device emits light; and the drain-source voltage difference of the driving transistor T1 is Vdd1−V2, i.e., Vdd1−(Vss+Voled).

In the above sensing period, the gate-source voltage difference of the driving transistor T1 is Vdata'−Vref, Vdata is the voltage of the detection data signal, and Vref is the voltage of the reference voltage signal; the voltage of the drain (the first electrode) of the driving transistor T1 is the voltage Vdd2 of the second power supply voltage signal, and the voltage of the source (the second electrode) of the driving transistor T1 is the voltage Vini of the initial signal; and the drain-source voltage difference of the driving transistor T1 is Vdd2−Vini.

Since Vdd2=Vini+(Vdd1−V2), the drain-source voltage difference of the driving transistor T1 in the driving period is equal to the source-drain voltage difference of the driving transistor T1 in the sensing period. As a result, the operating points of the driving transistor T1 are kept consistent in the sensing period and the driving period.

In this way, the variable power supply voltage generation device provides different power supply voltage signals in the driving period and the sensing period, and the voltage Vdd2 of the second power supply voltage signal has a specific corresponding relationship with the voltage Vdd1 of the first power supply voltage signal, the voltage V2 of the second electrode of the driving transistor in the driving period, and the voltage Vini of the initial signal, which causes the operating points of the driving transistor of the sub-pixel to maintain consistent in the sensing period and the driving period. For example, the drain-source voltage difference of the driving transistor of the sub-pixel maintains consistent in the sensing period and the driving period. Therefore, data of the driving current of the driving transistor T1 in the sensing state can accurately reflect data of the driving current of the driving transistor T1 in the driving state, which improves the coincidence degree of the I-V curve of the driving transistor T1 in the sensing state and the I-V curve of the driving transistor T1 in the driving state. As a result, it may be possible to improve the accuracy of the electrical properties of the driving transistor T1 obtained according to the I-V curve, and in turn ensure the compensation effect of the sub-pixels.

In some embodiments, the variable power supply voltage supply device 400A is disposed on a circuit board, and the circuit board is electrically connected to the display panel. For example, the circuit board is a PCB or an FPC.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display panel, comprising:

a plurality of sub-pixels, wherein each of the plurality of sub-pixels includes a pixel driving circuit and a first light-emitting device, the pixel driving circuit includes at least a driving transistor and a sensing transistor, a first electrode of the driving transistor is electrically connected to a power supply voltage signal terminal, a first electrode of the sensing transistor is electrically connected to a sensing signal terminal, and a second electrode of the driving transistor is electrically connected to a second electrode of the sensing transistor and a first electrode of the first light-emitting device; and at least one set voltage generation circuit, wherein an output terminal of a set voltage generation circuit is electrically connected to a sensing signal terminal of at least one sub-pixel, and the set voltage generation circuit is configured to generate a set voltage signal, and transmit the set voltage signal to a sensing transistor of the at least one sub-pixel and a second electrode of a driving transistor of the at least one sub-pixel in a sensing period, so that an operating point of the driving transistor of the at least one sub-pixel maintains consistent in the sensing period and a driving period;

wherein a voltage of the set voltage signal is substantially equal to a voltage of the second electrode of the driving transistor of the at least one sub-pixel in the driving period;

wherein the set voltage generation circuit includes a first transistor, a first storage capacitor, and a second light-emitting device, wherein a control electrode of the first transistor is configured to receive a control voltage signal, a first electrode of the first transistor is electrically connected to the power supply voltage signal terminal, and a second electrode of the first transistor is electrically connected to a first electrode of the second light-emitting device;

a first electrode of the first storage capacitor is electrically connected to the control electrode of the first transistor, and a second electrode of the first storage capacitor is electrically connected to the second electrode of the first transistor;

a second electrode of the second light-emitting device is electrically connected to a first voltage signal terminal; and the first electrode of the second light-emitting device is used as the output terminal of the set voltage generation circuit, and a voltage signal of the first electrode of the second light-emitting device is the set voltage signal.

2. The display panel according to claim 1, wherein electrical properties of the first transistor in the set voltage generation circuit are consistent with electrical properties of a driving transistor in a sub-pixel that is electrically connected to the set voltage generation circuit.

3. The display panel according to claim 2, wherein electrical properties of the second light-emitting device in the set voltage generation circuit are consistent with electrical properties of a first light-emitting device in the sub-pixel that is electrically connected to the set voltage generation circuit.

4. The display panel according to claim 1, wherein electrical properties of the second light-emitting device in the set voltage generation circuit are consistent with electrical properties of a first light-emitting device in a sub-pixel that is electrically connected to the set voltage generation circuit.

5. The display panel according to claim 1, wherein the display panel has a display area and a peripheral area, and the at least one set voltage generation circuit is disposed in the peripheral area.

6. The display panel according to claim 1, further comprising:

a plurality of sensing signal lines, wherein each sensing signal line is electrically connected to sensing signal terminals of one or more sub-pixels, and the sensing signal line is configured to obtain a sensing current signal of a driving transistor of a sub-pixel of the one or more sub-pixels through a sensing transistor of the sub-pixel of the one or more sub-pixels in the sensing period; and wherein the output terminal of the set voltage generation circuit is electrically connected to at least one sensing signal line, so as to be electrically connected to the sensing signal terminal of the at least one sub-pixel through the at least one sensing signal line.

7. The display panel according to claim 6, wherein the plurality of sub-pixels include at least sub-pixels of three colors;

the display panel comprises at least three set voltage generation circuits; each set voltage generation circuit is electrically connected to sub-pixels of a same color, and a color of light emitted by a second light-emitting device of each set voltage generation circuit is the same as a color of light emitted by first light-emitting devices of the sub-pixels of the same color electrically connected to each set voltage generation circuit.

8. The display panel according to claim 7, wherein the plurality of sub-pixels are arranged in an array, sub-pixels in a same column are of a same color, and each sensing signal line is electrically connected to a same column of sub-pixels;

each set voltage generation circuit is electrically connected to sensing signal lines of the plurality of sensing signal lines, and the sensing signal lines electrically connected to each set voltage generation circuit are electrically connected to the sub-pixels of the same color.

9. A display apparatus, comprising:

the display panel according to claim 1;

at least one current detection circuit, wherein each current detection circuit is electrically connected to at least one sensing signal line, and the current detection circuit is configured to: receive a sensing current signal from a sensing signal line of the at least one sensing signal line, integrate the sensing current signal, output a voltage drop, and calculate a value of a driving current of a driving transistor of a sub-pixel electrically connected to the sensing signal line according to the voltage drop; and at least one set voltage follower circuit, wherein an input terminal of each set voltage follower circuit is electrically connected to the output terminal of the set voltage generation circuit, and an output terminal of each set voltage follower circuit is electrically connected to one or more current detection circuits of the at least one current detection circuit;

wherein the set voltage generation circuit is electrically connected to the sensing signal terminal of the at least one sub-pixel through the set voltage follower circuit, the one or more current detection circuits, and one or more sensing signal lines; and the set voltage follower circuit is configured to: receive the set voltage signal output by the set voltage generation circuit, perform a filtering process on the set voltage signal, and transmit a processed set voltage signal to the at least one sub-pixel.

10. The display apparatus according to claim 9, wherein the set voltage follower circuit includes a first operational amplifier and a second storage capacitor, wherein a non-inverting input terminal of the first operational amplifier is electrically connected to the output terminal of the set voltage generation unit, an inverting input terminal of the first operational amplifier is electrically connected to an output terminal of the first operational amplifier, and the output terminal of the first operational amplifier is used as the output terminal of the set voltage follower circuit; and a first electrode of the second storage capacitor is electrically connected to the non-inverting input terminal of the first operational amplifier, and a second electrode of the second storage capacitor is electrically connected to a second voltage signal terminal; and wherein the one or more current detection circuits each include:

a second operational amplifier, wherein a non-inverting input terminal of the second operational amplifier is electrically connected to the output terminal of the set voltage generation circuit, an inverting input terminal of the second operational amplifier is coupled to at least one of the one or more sensing signal lines, so that the output terminal of the set voltage generation circuit is electrically connected to a sensing signal terminal of at least one sub-pixel through the current detection circuit;

an integrating capacitor, wherein the integrating capacitor is coupled between the inverting input terminal of the second operational amplifier and an output terminal of the second operational amplifier; and a first switch, wherein the first switch is coupled between the inverting input terminal of the second operational amplifier and the output terminal of the second operational amplifier, and the first switch and the integrating capacitor are connected in parallel.

11. The display apparatus according to claim 10, further comprising: a source driver electrically connected to the plurality of sub-pixels, wherein the at least one current detection circuit and the at least one set voltage follower circuit are integrated in the source driver.

12. The display apparatus according to claim 9, further comprising: a source driver electrically connected to the plurality of sub-pixels;

wherein the at least one current detection circuit and the at least one set voltage follower circuit are integrated in the source driver.

13. A current sensing method of a pixel driving circuit of a display apparatus, wherein the display apparatus is the display apparatus according to claim 9, the set voltage generation circuit includes a first transistor, a first storage capacitor and a second light-emitting device, the current sensing method comprising:

receiving, by the first transistor of the set voltage generation circuit, a control voltage signal and a power supply voltage signal;

generating, by the first transistor of the set voltage generation circuit, a driving current due to the control voltage signal and the power supply voltage signal, wherein a voltage of the control voltage signal is obtained according to a corresponding relationship between a target brightness of a first light-emitting device of a sub-pixel to be detected and a voltage value of a control electrode of the driving transistor of the sub-pixel to be detected;

outputting, by the set voltage generation circuit, the set voltage signal according to the driving current;

receiving, by the current detection circuit electrically connected to the set voltage generation circuit, the set voltage signal; and transmitting, by the current detection circuit, the set voltage signal to a sensing signal terminal of a sub-pixel electrically connected to the current detection circuit in the sensing period.

14. The display apparatus according to claim 9, wherein the set voltage generation circuit includes a first transistor, a first storage capacitor, and a second light-emitting device, wherein a control electrode of the first transistor is configured to receive a control voltage signal, a first electrode of the first transistor is electrically connected to the power supply voltage signal terminal, and a second electrode of the first transistor is electrically connected to a first electrode of the second light-emitting device;

a first electrode of the first storage capacitor is electrically connected to the control electrode of the first transistor, and a second electrode of the first storage capacitor is electrically connected to the second electrode of the first transistor;

a second electrode of the second light-emitting device is electrically connected to a first voltage signal terminal; and the first electrode of the second light-emitting device is used as the output terminal of the set voltage generation circuit, and a voltage signal of the first electrode of the second light-emitting device is the set voltage signal.

15. The display panel according to claim 1, further comprising:

a plurality of sensing signal lines, wherein each sensing signal line is electrically connected to sensing signal terminals of one or more sub-pixels, and the sensing signal line is configured to obtain a sensing current signal of a driving transistor of a sub-pixel of the one or more sub-pixels through a sensing transistor of the sub-pixel of the one or more sub-pixels in the sensing period; and wherein the output terminal of the set voltage generation circuit is electrically connected to at least one sensing signal line, so as to be electrically connected to the sensing signal terminal of the at least one sub-pixel through the at least one sensing signal line.

16. A display apparatus, comprising:

a display panel, wherein the display panel includes a plurality of sub-pixels, each sub-pixel includes a pixel driving circuit and a first light-emitting device, the pixel driving circuit includes at least a driving transistor and a sensing transistor, a first electrode of the driving transistor is electrically connected to a power supply voltage signal terminal, a first electrode of the sensing transistor is electrically connected to a sensing signal terminal, a second electrode of the driving transistor is electrically connected to a second electrode of the sensing transistor and a first electrode of the first light-emitting device, and a second electrode of the first light-emitting device is electrically connected to a first voltage signal terminal; and wherein the sensing signal terminal is configured to transmit an initial signal to the second electrode of the sensing transistor and the second electrode of the driving transistor in a sensing period; and a variable power supply voltage supply device, wherein the variable power supply voltage supply device is electrically connected to the power supply voltage signal terminal, and the variable power supply voltage supply device is configured to: provide a variable power supply voltage signal, provide a first power supply voltage signal to the sub-pixel in a driving period, and provide a second power supply voltage signal to the sub-pixel in the sensing period, so that an operating point of the driving transistor of the sub-pixel maintains consistent in the sensing period and the driving period; and wherein a relationship between a voltage Vdd2 of the second power supply voltage signal and a voltage Vdd1 of the first power supply voltage signal, a voltage V2 of the second electrode of the driving transistor in the driving period, and a voltage Vini of the initial signal is: $Vdd2=Vini+(Vdd1-V2)$.

17. The display apparatus according to claim 16, wherein the variable power supply voltage supply device is disposed on a circuit board, and the circuit board is electrically connected to the display panel.

* * * * *